Jan. 19, 1937.    D. B. BANKS ET AL    2,068,257
FILTERING APPARATUS
Filed Nov. 26, 1934    9 Sheets-Sheet 1
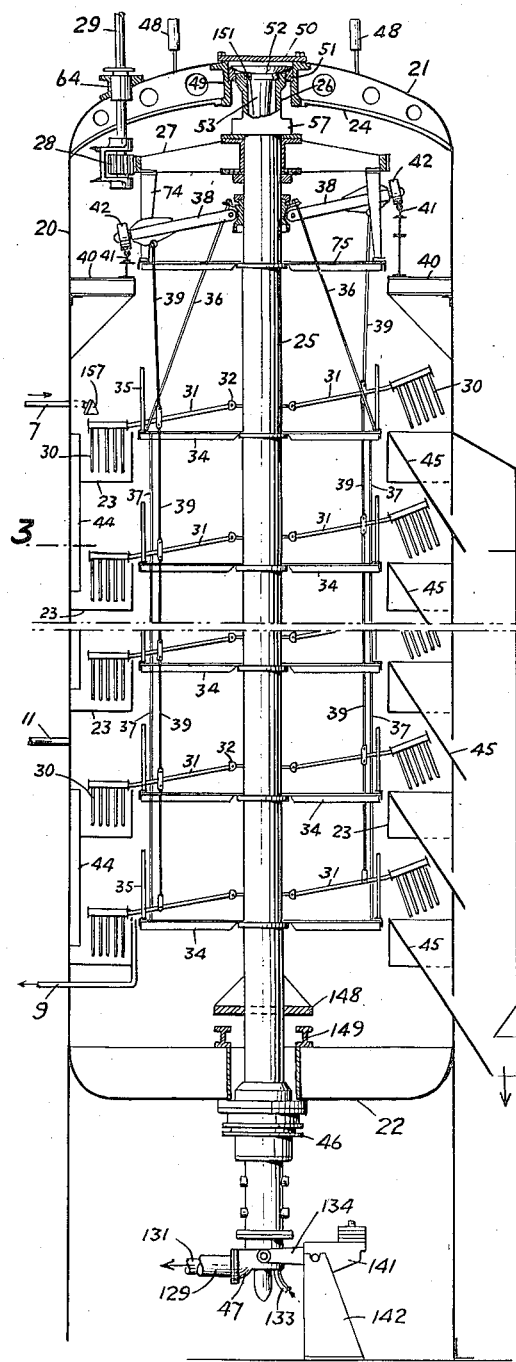
FIG. 2.
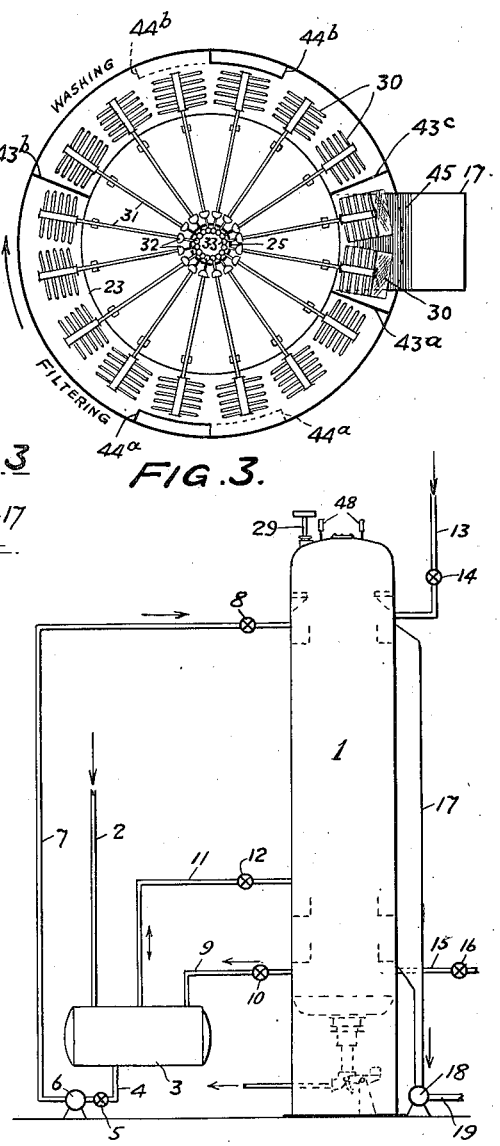
FIG. 3.
FIG. 1.
INVENTORS
Daniel B. Banks
Paul D. Barton
BY
Busser and Harding
ATTORNEYS.
WITNESS:
Rob R Kitchel

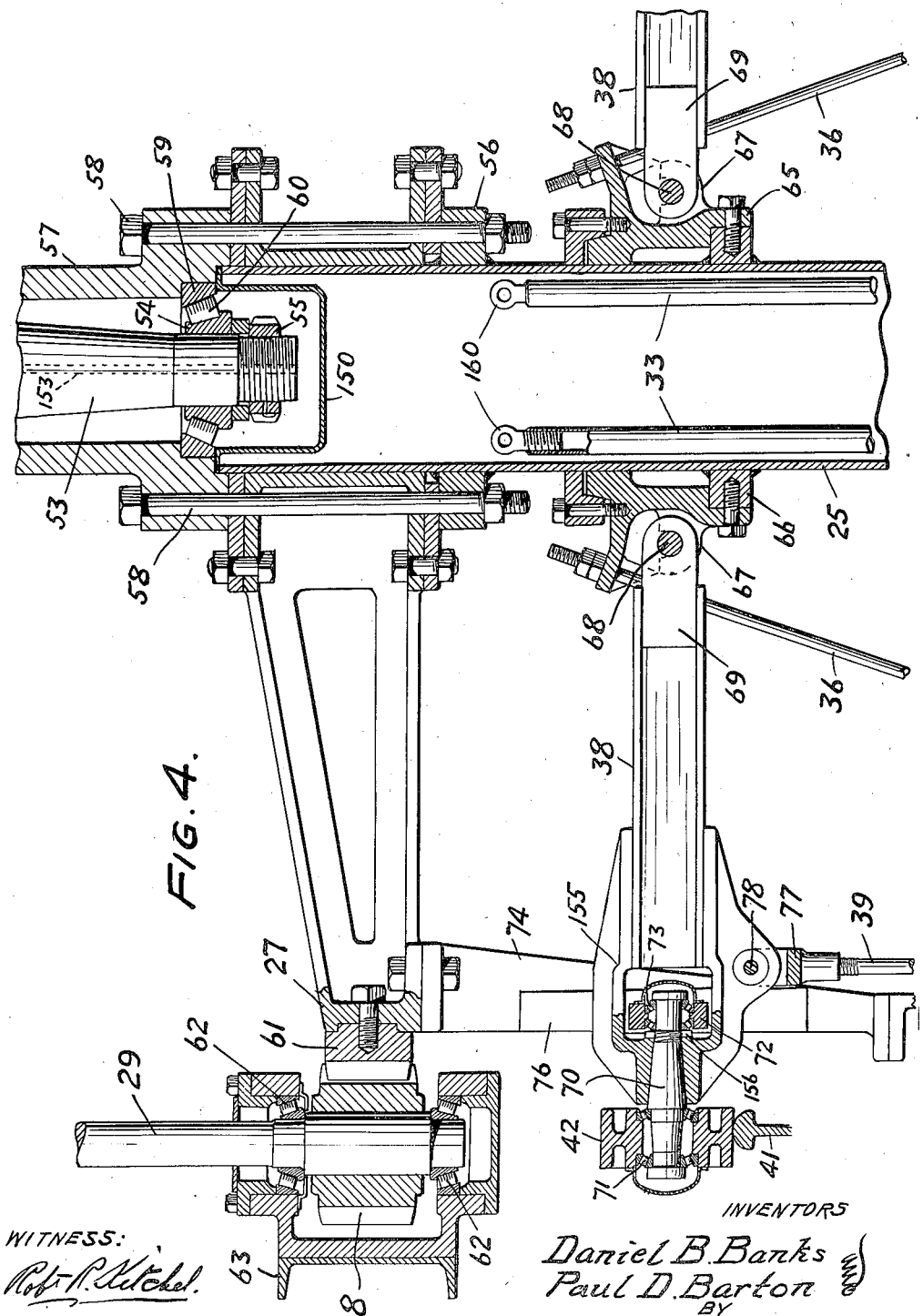

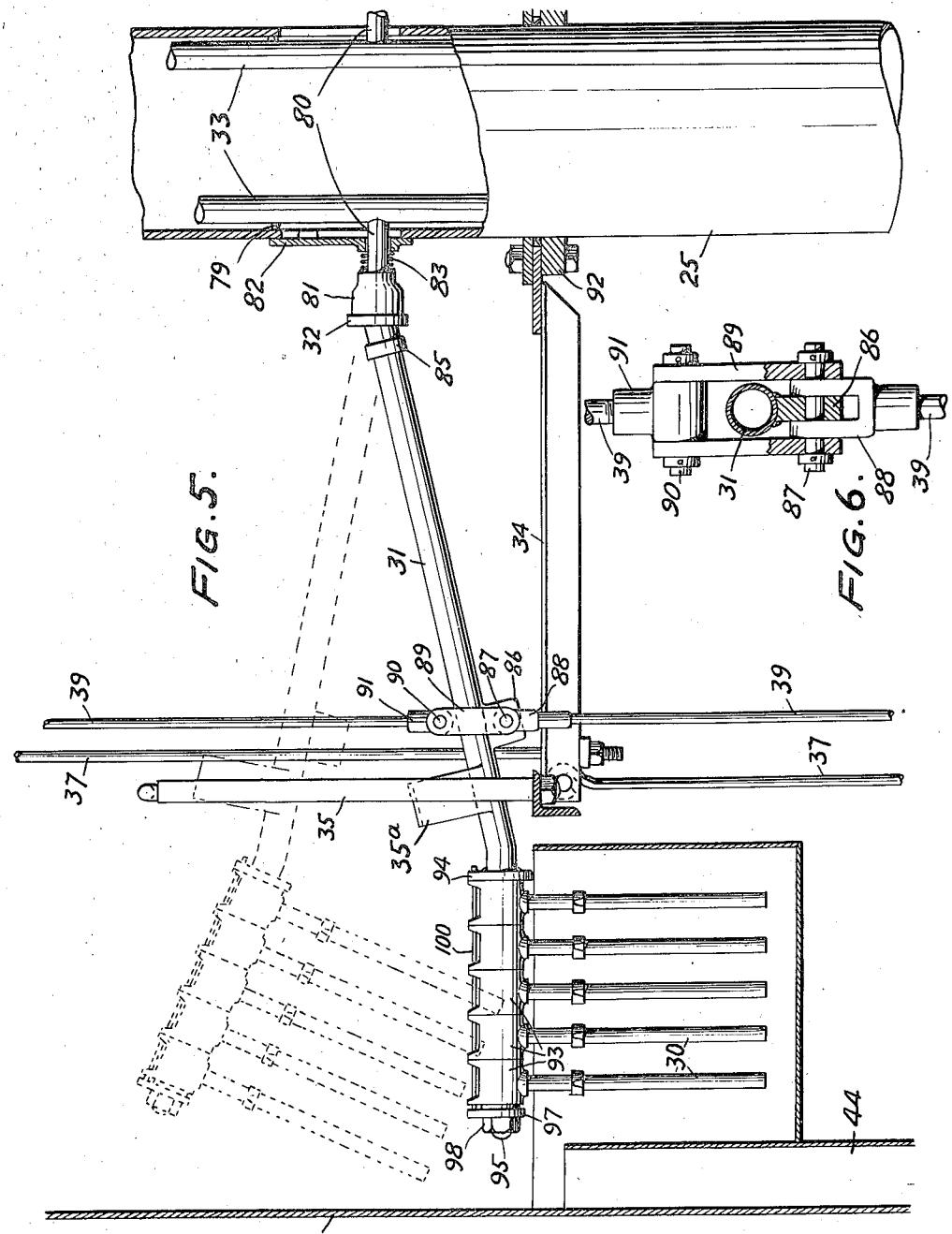

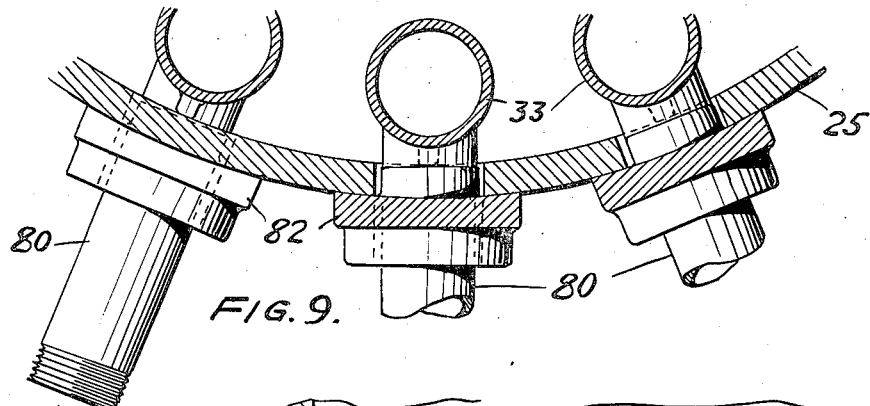
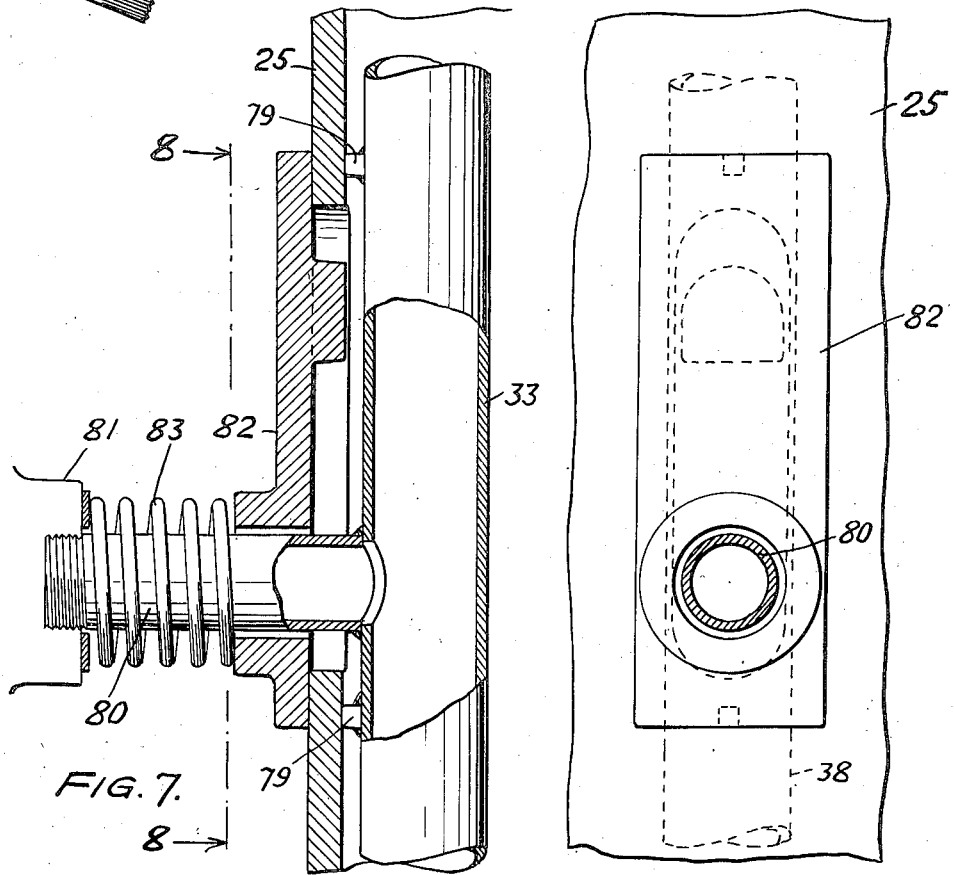

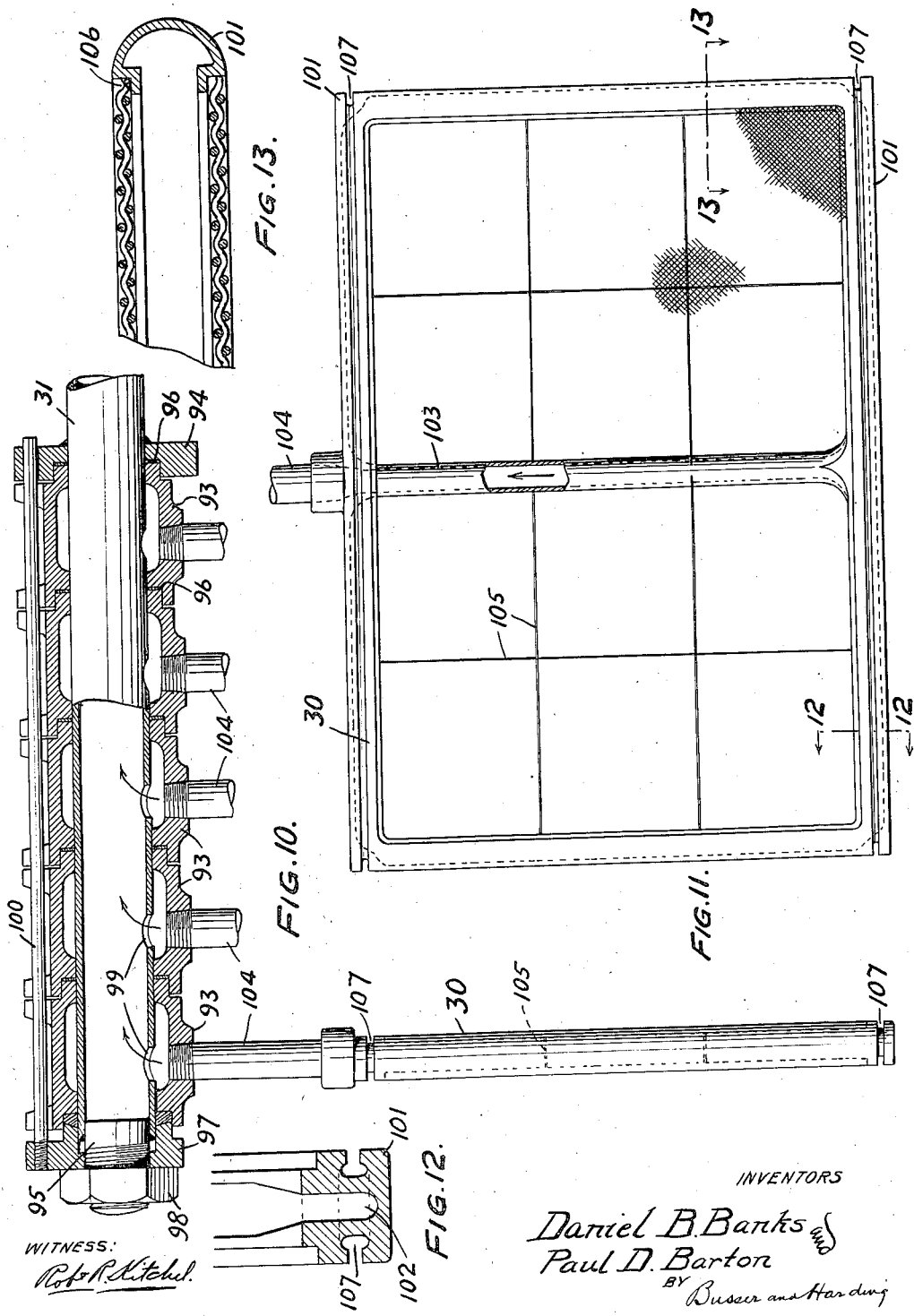

Jan. 19, 1937.  D. B. BANKS ET AL  2,068,257
FILTERING APPARATUS
Filed Nov. 26, 1934  9 Sheets-Sheet 7

WITNESS:
Rob R Kitchel.

INVENTORS
Daniel B. Banks
Paul D. Barton
BY
Bruer and Harding
ATTORNEYS.

Jan. 19, 1937.  D. B. BANKS ET AL  2,068,257
FILTERING APPARATUS
Filed Nov. 26, 1934  9 Sheets-Sheet 8

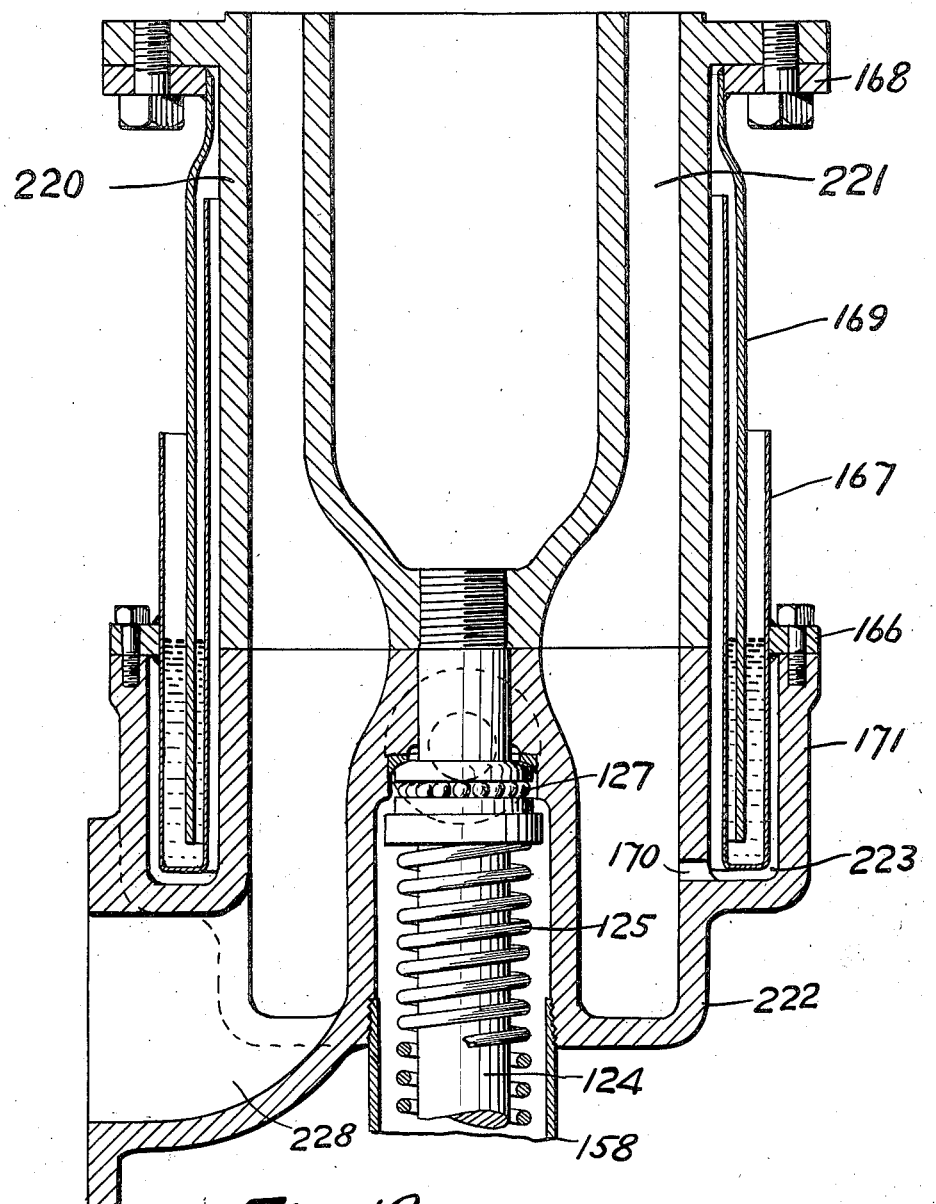

Patented Jan. 19, 1937

2,068,257

UNITED STATES PATENT OFFICE 2,068,257

FILTERING APPARATUS

Daniel B. Banks, Upper Darby, and Paul D. Barton, Wynnewood, Pa., assignors, by mesne assignments, to Sun Oil Company, Philadelphia, Pa., a corporation of New Jersey Application November 26, 1934, Serial No. 754,714

17 Claims. (Cl. 210—153)

This invention relates to an improved filtering appartus and more particularly to an improved continuous vacuum filter especially adapted for filtering chilled mixtures of mineral oil, wax, and propane to separate the wax in the form of a filter cake from the mineral oil and propane.

Heretofore, in filtering chilled solutions of mineral oil, wax and a solvent it has been proposed to use rotary drum filters of either a pressure or vacuum type in which the drum is partially submerged in the mixture to be filtered, the filter cake which forms on the durm during its passage through the mixture being washed by a spray of the solvent, and the filter cake continuously removed from the drum by a scraper. For large commercial installations, however, such filters are not satisfactory, since in order to obtain sufficient filtering surface, it is necessary to employ such a large number of filters that the power required to operate them and the floor space occupied by them makes their operation uneconomical. Also, it is impossible to adequately wash the filter cake by means of a spray, so that a large amount of the mineral oil cannot be recovered therefrom and is therefore lost. There are a number of other objections to any of the filters now used when filtering a chilled mixture of oil, wax and solvent on a commercial scale.

It is therefore an object of this invention to provide an improved filtering apparatus which is especially adapted to the continuous filtration of chilled mixtures of oil, wax and a solvent.

It is a further object of this invention to provide such a filtering apparatus which requires a minimum of space and which requires a minimum of power to operate.

It is a further object of this invention to provide such a filtering apparatus in which the filter cake will be thoroughly washed by being completely submerged in the washing fluid.

Other and further objects will be apparent to one skilled in the art, on reading this specification and on reference to the drawings attached thereto.

We have discovered that very good results may be obtained by using ordinary leaf filters and that sufficient filtering surface may be obtained by arranging these leaf filters in the manner disclosed in this specification. Briefly stated then, the apparatus disclosed and claimed in this application consists of a vertical cylindrical tower, within which is arranged a multiplicity of superimposed annular trays divided into three sections, (filtering, washing, and cake removing). Suspended within the tower is a central shaft, to which the filter leaves are connected by filter arms; means being provided for rotating the central shaft and the filter arms and leaves connected thereto. The mixture to be filtered is admitted to the filtering sections of the trays and wash fluid is admitted to the wash sections of the trays. Means are provided for lifting the filter arms and leaves from one section of the trays to the next; and a rotary valve is provided whereby suction may be applied to the filter leaves, through collecting pipes in the central shaft and the filter arms, while said leaves are in the filtering and washing sections of the trays, and pressure applied to said filter leaves while they are in filter cake removal position.

Referring now to the drawings which are attached hereto, and which form a part of this specification, and in which like numbers refer to like parts throughout:

Fig. 1 is a diagrammatic representation of a filter built acording to this invention, showing the flow thereto;

Fig. 2 is vertical section through the filter;

Fig. 3 is a section taken on the line 3—3 of Fig. 2;

Fig. 4 is a detail, partly in section, of the suspension means and drive means of the filter;

Fig. 5 is a detail, partly in section, showing the filter arms and the means of suspending the same;

Fig. 6 is a detail, partly broken away, showing the means for connecting the filter arms to the suspension means;

Fig. 7 is vertical section showing the means for connecting the filter arms to the collecting pipes located in the central shaft;

Fig. 8 is a section taken on the line 8—8 of Fig. 7;

Fig. 9 is a horizontal section showing the means for connecting the filter arms to the collecting pipes located in the central shaft;

Fig. 10 is a detail partly in section showing the method for attaching the filter leaves to the filter arms;

Fig. 11 is a detail view showing a filter leaf with the filter cloth removed;

Fig. 12 is a section taken on the line 12—12 of Fig. 11;

Fig. 13 is a section taken on the line 13—13 of Fig. 11;

Fig. 19 is a vertical section of a modified form of valve assembly at the bottom of the central shaft, showing a positive mercury seal between the two halves of the valves.

Figure 14:
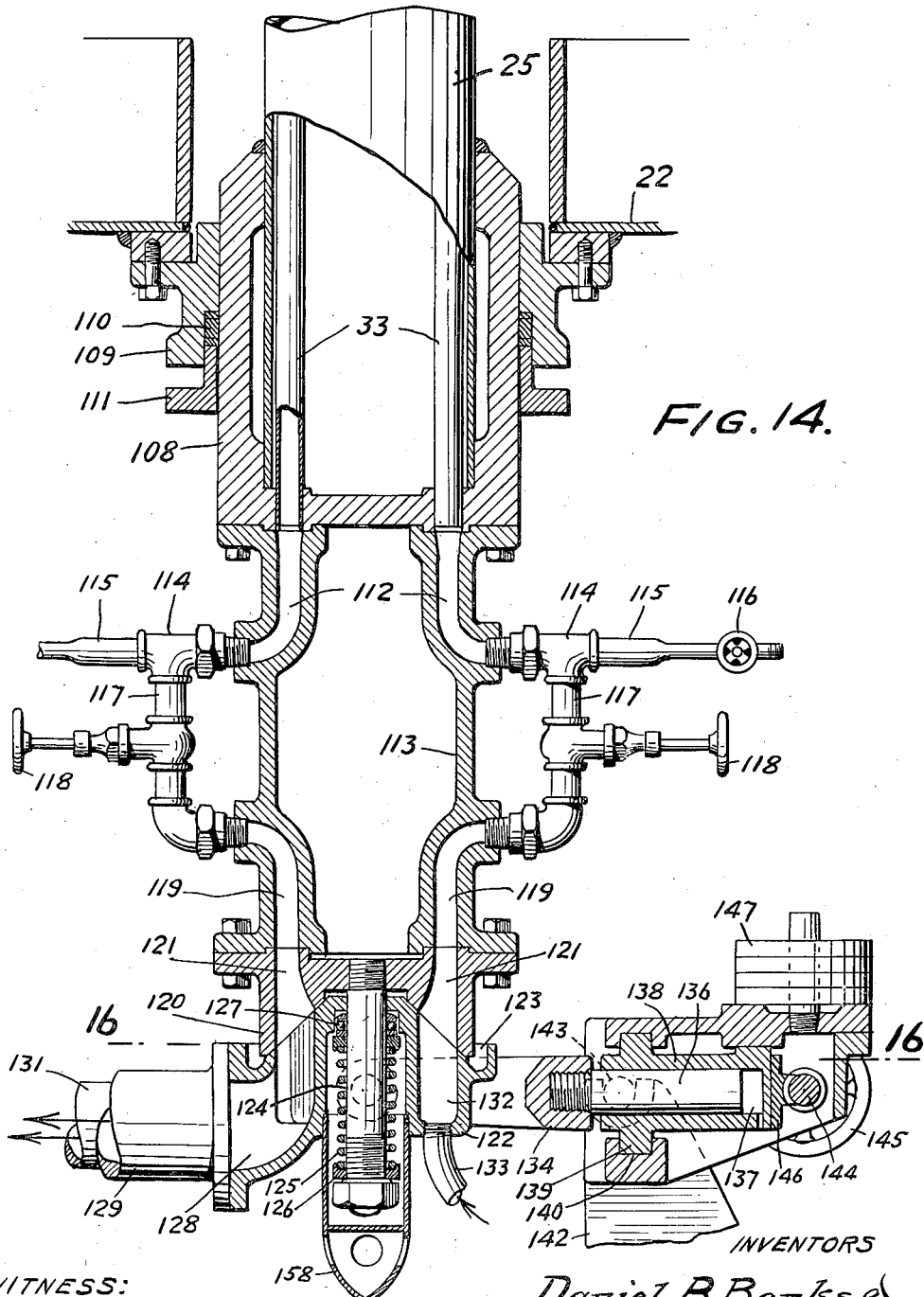
Fig. 14 is a vertical section of the valve assembly at the bottom of the central shaft.

Referring now to Figs. 1 and 2, the solution to be filtered is introduced through pipe 2 to a surge tank 3. From this surge tank the mixture is withdrawn through pipe 4 and valve 5, by pump 6, and forced through pipe 7 and valve 8 to be introduced to the filtering section of the top tray of the tower. The mixture flows down through the filtering sections of the trays and any excess thereof is withdrawn through pipe 9 and valve 10 to the surge tank 3. A pressure equalizing line 11, having valve 12 therein connects the surge tank to the interior of the tower 1 and equalizes the pressure between these two. The wash fluid is introduced to the wash section of the top filter tray of the tower through line 13 having valve 14 therein and flows downwardly through the washing sections of the trays and any excess wash fluid is withdrawn through line 15 having valve 16 therein. The filter cake is removed through flume 17 and is forced by pump 18 through line 19 to a suitable tank.

Referring more particularly to Fig. 2, the vertical tower consists of a cylindrical casing 20, having a closed top 21 with suitable safety valves 48 therein, and bottom 22. Arranged within the tower are a multiplicity of superimposed annular trays 23, there being preferably about ten of these trays in each tower. The top of the tower is reinforced by members 24 and suspended therefrom is a central vertical shaft 25. This shaft is suspended by a bearing indicated generally as 26 and which will be described more in detail hereafter. Attached to the central shaft near the top thereof is a large drive wheel 27 driven by a small pinion gear 28 on shaft 29 which is driven by any suitable source of power. A multiplicity of filter leaves 30 are arranged within each of the filter trays 23. These filter leaves are connected by means of filter arms 31 through ball and socket joints 32 to collecting pipes 33 arranged within the central shaft 25, as will be explained hereafter more in detail. There are preferably about five filter leaves attached to each filter arm, and preferably about 16 radial filter arms extending from the central shaft at the level of each tray.

Each of the annular trays 23 is divided into three sections, a filtering section, a wash section and a filter cake removal section, by partitions 43a, 43b and 43c. Suitable downcomers 44a are provided between the filter sections of the adjacent trays, so that the mixture to be filtered, which is introduced into the top tray, may flow downwardly through the trays, any excess mixture being removed from the bottom tray through line 9. Similar downcomers 44b are provided between the wash sections of adjacent trays so that the wash fluid which is introduced in the top tray through line 13 may flow downwardly through the trays, any excess wash fluid being removed from the bottom tray through line 15. The filter cake removal section of the trays has an inclined bottom 45 discharging to wax chute or flume 17.

Attached to the central shaft are spiders 34 which rotate with the shaft and by means of guide members 35 cause rotation of the filter arms and filter leaves attached thereto. Top spider 34 is suspended from the central shaft by rods 36 and the lower spiders are suspended from one another by staggered rods 37. The filter arms 31 are suspended from suitable lifting arms 38 by rods 39.

Near the top of the tower, mounted on supporting framework 40, is a circular track 41 on which wheels 42 of the lifting arms 38 travel. Track 41 is in the form of a cam and as the lifting arms 38 are rotated by arms 74 depending from drive wheel 27, the cam track 41 raises and lowers each lifting arm thus raising and lowering the filter arms and leaves connected thereto through rods 39 as they come to the partitions dividing the tray sections, as more fully described hereafter.

A ring 148 welded to the central shaft near the bottom thereof is adapted to rest on beams 149, extending across the bottom of the tower, when the central shaft is lowered as hereinafter described. Suitable packing means, indicated generally as 46 and more fully described hereinafter, are provided between central shaft 25 and tower bottom 22 at the point where the central shaft passes through the tower bottom. Connected to the bottom end of the shaft 25 is a rotary valve mechanism 47 more fully described in connection with Fig. 14.

Figure 17:
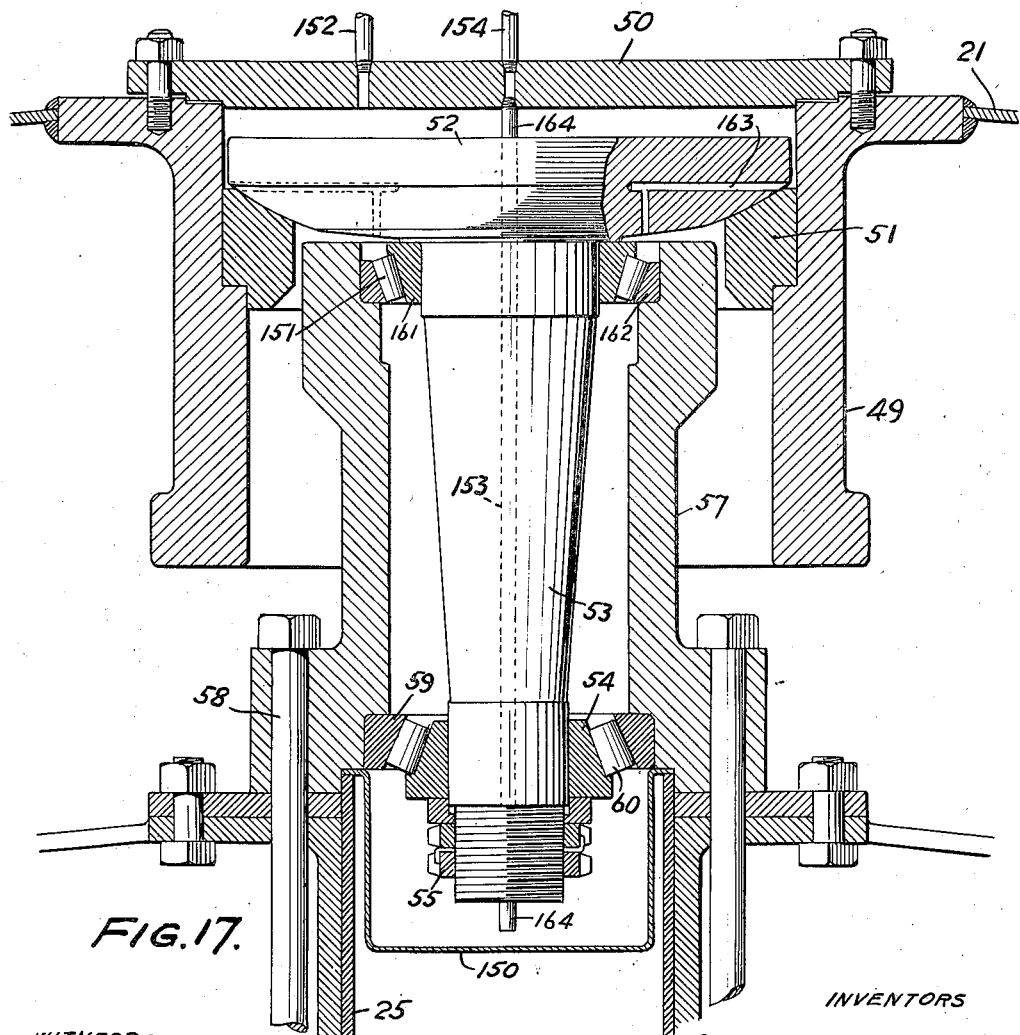
Fig. 17 is a detail, partly in section, of the suspension bearing for the central shaft.

The suspension means for the central shaft and the drive means therefor is as follows: Connected to the reinforcing framework 24 at the top of the tower 21 is a collar 49, (Figs. 2, 4, and 17) closed at its upper end by removable plate 50. A ring 51 is seated in this collar and the head 52 of shaft 53 rests thereon. Bearing race 54 is held on the lower end of shaft 53 by nut 55 which is keyed to the shaft 53. A pipe 56 is welded to the central shaft 25 near the top thereof and is connected to member 57 by bolts 58. A bearing race 59 is held in a channel near the bottom of member 57 and roller bearings 60 are placed between bearing races 54 and 59, thereby supporting the central shaft 25 from shaft 53. Roller bearings 151 held between bearing race 161 on stub shaft 53 and race 162 on member 57 act as guide bearings between said shaft 53 and member 57. It is to be noted that the spherical shaped head 52 of shaft 53 which bears against ring 51 forms a sort of universal joint, thus properly supporting central shaft 25 even in case it is not exactly perpendicular.

A cup shaped member 150 (Fig. 4) fits within the top of the central vertical shaft 25 and closes the opening between the shaft 25 and member 57 when the bolts 58 are drawn up. Bearing 60 and guide bearing 151 are lubricated by introducing lubricant through line 152 extending through removable cover plate 50. The lubricant collects around the head 52 of shaft 53 and drops through openings 163 therein to bearings 151, the lubricant then flows down the space between shaft 53 and member 57, and flows over bearing 60, collecting in cup 150 and being removed therefrom through line 164 extending through hole 153, drilled longitudinally through shaft 53, and through line 154 connected to line 164 through removable cover plate 50.

The main drive wheel 27 is connected to ring 56 and to member 57 by the bolts 58. Gear segments 61 are bolted to the main drive wheel 27. Gear 61 is driven by pinion 28 connected to shaft 29. This shaft 29 is supported by bearings 62 fastened by channel bar 63 to the casing 20 near the top thereof. The shaft 29 extends through the top of the tower 21 through packing member 64, and is driven by any suitable means.

Sixteen radial lifting arms 38 are connected to the vertical shaft 25 by means of the collar 65 which is bolted to ring 66 welded to the vertical shaft. The collar 65 has bearing hooks 67 which support pins 68 extending between plates 69 which are welded to the lifting arms 38. The supporting rods 36 for the top spiders 34 are also connected to the collar 65 as shown in Fig. 4. A casting 155 in which stub shaft 70 is held by nut 156 is attached to the outer end of each lifting arm 38. The wheel 42 which runs on cam track 41 is mounted on the outer end of shaft 70, in the open box in casting 155, is a guide wheel 72 mounted on shaft 70 by bearing 73. Guide fingers 74 are attached to main drive wheel 27 and extend downwardly to spiders 75 connected to the center shaft 25. The guide wheel 72 rotates against bearing surfaces 76 on guide fingers 74, when the lifting arms 38 are being raised or lowered. The lifting rods 39 which support the filter arms 31 are connected to the casting 155 by clevis 77 and pin 78.

Referring now more particularly to Figs. 5 and 6, and the assembly of the filter arms, the sixteen collecting pipes 33 are arranged within the central shaft 25 (as shown in Fig. 3). These collecting pipes 33 are spaced from the central shaft 25 by means of small spacers 79 welded to the collecting pipes. Slightly above the level of each of the annular trays there is an opening in the central shaft 25 through which a nipple 80 extends from the collecting pipe 33. The outer end of nipple 80 is connected to a socket joint 81. A plate 82 covers the openings in central shaft 25 and is held against the central shaft by spring 83 pressing against the socket 81 and plate 82 thereby permitting expansion and contraction of collecting pipes 33. A ball joint 85 is connected to socket 81 and filter arms 31 are connected thereto. The filter arms 31 are connected to lifting rods 39 as shown in detail in Fig. 6. A lug 86 is welded to the filter arm 31 and pin 87 connects this lug to clevis 88 at the top of the lower lifting rod 39, and to links 89 which are connected by means of pin 90 to connection 91 at the bottom of the upper lifting rod 39.

Spiders 34 are connected to the central shaft 25 by being bolted to a ring 92 which is welded to the central shaft. Vertical guides 35 are bolted to the outer edge of spiders 34 and serve to drive the filter arms 31 as the shaft 25 is rotated, these guide members also operating as vertical guides when the filter arms with guide shoe 35a are being raised or lowered. The filter leaves 30 are connected by nipples 104 to collars 93 which are slipped over the end of filter arms 31, as shown in Figs. 5 and 10. A collar 94 is welded to the filter arms 31 and the ends of filter arms 31 are closed by pin 95 welded in the end thereof. Suitable packing 96 is provided between adjacent headers 93 and collar 97 is slipped over the end of filter arm 31, and is keyed to pin 95 to prevent any rotation of collar 97 and drawn up thereon by nut 98 on pin 95. Holes 99 are provided in the filter arms 31 over each of the filter leaves 30. A rod 100, passing through collar 94 and slots in the top of collars 93 and screwed into collar 97, prevents any rotation of collars 93 and the filter leaves 30 attached thereto, as shown in Fig. 10. The adjacent spiders 34 are suspended from one another by means of rods 37 as shown in Fig. 5. The construction of the filter leaves is shown in detail in Figs. 10 to 13 inclusive. The filter leaves consist of a frame 101 (shown in Fig. 11), a collecting groove 102 being provided in the bottom of each frame and a pipe 103 leading from groove 102 through connecting nipple 104 to headers 93. A light framework of perforated metal strips 105 is arranged within the framework 101. A covering of wire mesh is fitted in groove 106 in the frame 101 as shown in Fig. 13. A filter cloth in the form of a tube is slipped over the frame and is connected thereto by forcing the filter cloth into grooves 107 around the top and bottom of frame 101 by means of a packing cord. If desired, the bottom groove 107 in the frame 101 may be omitted, and a filter cloth in the form of a bag closed at one end, slipped over the frame and connected thereto by forcing the filter cloth into groove 107 at the top of frame 101 by means of a packing cord.

Figure 15:
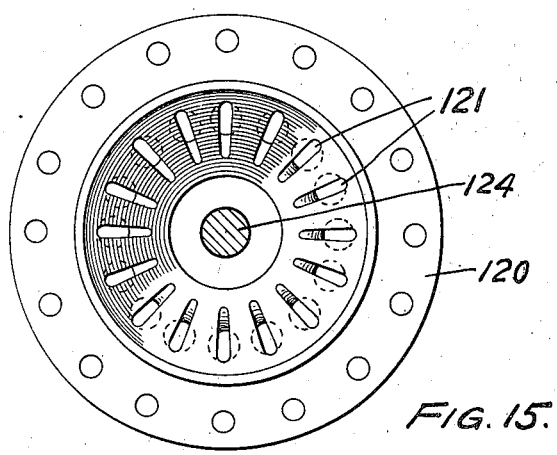
Fig. 15 is a detail view looking up at the top half of the valve shown in Fig. 14.
Figure 16:
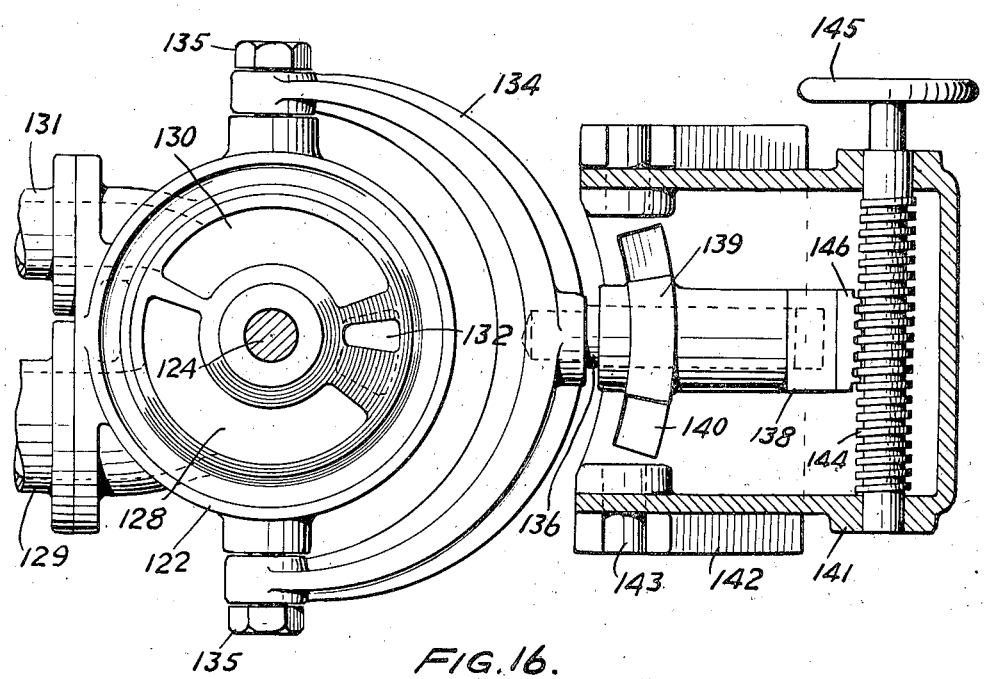
Fig. 16 is a section taken on the line 16—16 of Fig. 14.

Referring now more particularly to Figs. 14 to 16 inclusive, showing the valve mechanism at the bottom of vertical shaft 25. A cap 108 is welded to the bottom of the central shaft 25 as shown in Fig. 14. A suitable collar 109 surrounds cap 108 and is bolted to a ring welded to the bottom 22 of the tower 1. Suitable packing 110 seals the joint between cap 108 and collar 109, being held in place by packing gland 111. Each of the collection pipes 33 is rolled into an opening in the bottom of cap 108 which register with corresponding openings 112 in member 113 bolted to the bottom of cap 108. Each opening 112 is connected to a T 114. A sample pipe 115 having valve 116 therein leads from one branch of the T 114. The other branch of T 114 leads to pipe 117 having valve 118 therein, pipe 117 being connected to openings 119 in the member 113. The member 113 is bolted to the upper half 120 of the rotary valve mechanism, openings 121 in member 120 registering with openings 119 in member 113. Openings 121 at their bottom assume the shape of elongated slots. The lower half 122 of the rotary valve mechanism presses against the upper half 120 of the valve and an oil seal groove 123 is provided between the two edges of the valve. A bolt 124 is attached to the upper half of the valve mechanism and a spring 125 pressing against collar 126 on bolt 124 and bearing 127 which presses against the lower half 122 of the valve mechanism holds the valve members in alignment. Cap 158 attached to lower half 122 of the valve prevents any air being admitted to the filtrate or used wash fluid through the opening through which bolt 124 passes. The lower half of the valve mechanism is provided with three openings, a filtrate outlet, 128, which is connected to line 129 through which the filtrate is withdrawn from the filter, a wash fluid outlet 130 which is connected to pipe 131 through which the used wash fluid is withdrawn from the filter and a blow opening 132 which is connected to pipe 133 through which gas under pressure, for blowing the filter cake from the filter leaves, is admitted to the lines 129 and 131 may be made of some flexible material, not affected by oil or cold, which is reinforced by wire spirals, or they may be metal pipes provided with ball and socket joints.

Lower half 122 of the valve mechanism is connected to the yoke 134 by pins 135, a clearance of about an eighth of an inch being left between yoke 134 and the lower half 122 of the valve, and between yoke 134 and the heads of pins 135. Yoke 134 is connected to pin 136 which is free to slide in opening 137 in member 138. Two projections 139 in member 138 slide in grooves 140 in framework 141 which is pivotally supported on uprights 142 by pins 143. A worm gear 144 having handwheel 145 is provided in frame 141, and by means of gear segment 146 connected to member 138, the lower half 122 of the valve mechanism may be rotated to adjust the time of applying suction or pressure to the filter. Counterweights 147 are placed on frame 141 so that none of the weight of the lower half 122 of the valve mechanism and connections is borne by spring 125.

Since one side of the lower half 122 of the valve mechanism will probably be heavier than the other side, due to the outlets from filtrate opening 128 and wash fluid opening 129 being placed on one side, it may be properly counterbalanced in any suitable manner as by adding excess metal or weights to the other side.

A slightly modified form of valve mechanism, having a positive mercury seal between the two halves thereof, is illustrated in Fig. 19. In this form the upper half 220 of the valve mechanism (corresponding to upper half 120 in Fig. 14) is bolted to member 113 as hereinbefore described, openings 221 in upper half 220 registering with openings 119 in member 113. Lower half 222 of the valve mechanism (corresponding to lower half 122 of Fig. 14) is pressed against the upper half thereof by springs 125 which presses against collar 126 (Fig. 14) on bolt 124, attached to upper half 220 of the valve mechanism, and bearing 127 which presses against the lower half 222 of the valve mechanism. The lower half 222 of the valve mechanism (shown in Fig. 19) is provided with a filtrate outlet 228, a wash fluid outlet, and a blow opening; and suitable valve adjusting mechanism as shown and described in connection with Fig. 14 is also provided. A ring 166 supporting cup 167 is bolted to the upper edge of lip 171 forming a deep annular groove 223 on the lower half 122 of the valve mechanism, said annular U- or J-shaped cup 167 being welded to ring 166 by a continuous weld. A ring 168 is bolted to upper half 220 of the valve mechanism and cylindrical sleeve 169 is welded thereto by a continuous weld. This sleeve extends well towards the bottom of the U-shaped portion of annular cup 167 and well below the surface of a bath of mercury maintained therein. Small openings 170 permit any fluid, which leaks past the joint between the two halves of the valve to drain into the filtrate outlet 128.

Due to the vacuum in the filtrate outlet, the mercury will rise in the space between the inner wall of cup 167 and sleeve 169 until there is a column of mercury equal to the vacuum being applied. Thus, if the filter is operating under a vacuum of ten inches of mercury, there will be a ten inch column of mercury between cup 167 and sleeve 169. These elements should be made long enough so that there may be a fifteen inch column of mercury in order to care for any short periods of unusually high vacuum. If necessary, due to the extremely low temperatures at which these filters are sometimes operated, a suitable steam or electric heating coil (not shown) may be placed around the cup 167 to keep the mercury in liquid form. From the above description it is apparent that cup 167 remains stationary with lower half 222 of the valve mechanism while sleeve 169 rotates with upper half 220 of the valve mechanism, while the mercury forms a positive seal between the two halves of the valve mechanism and prevents any air being admitted through the joint between upper half 220 and lower half 222 of the valve.

The operation of the filter is as follows: A chilled mixture of oil, wax, and propane, prepared in any suitable manner used in propane dewaxing of hydrocarbon oils, is introduced through pipe 2 to surge tank 3. This mixture is withdrawn continuously from surge tank 3 through line 4, valve 5, and pump 6, and is introduced through line 7 and valve 8 to the top tray in the tower 1. The line 7 preferably enters the tower 1 somewhat above the fluid level of the top tray. This line terminates in a head 157 on the inner side of casing 20 which deflects the solution, which is being introduced to the tower, so that it will flow down the sides thereof into the filtering section of the top tray. The solution to be filtered fills the top tray until it comes level to the upper end of the downcomers 44a in the filtering section of the top tray. The solution then flows down through downcomers 44a and fills the filtering section of the next lower tray and in this manner continues downwardly through the trays until all the trays are filled. Any excess of the solution to be filtered is withdrawn from the bottom tray through line 9 and flows into the surge tank 3. The system is so operated as to maintain a continuous circulation of solution from the surge tank to the top tray and from the bottom tray back to the surge tank. This serves to maintain a fixed liquid level in the trays as long as an excess quantity is circulated. If desired, outlets may be provided for line 7 to a number of the trays.

At the same time, wash fluid, such as chilled propane, is admitted in a similar manner to the wash section of the top tray through line 13 and completely fills the wash section of the top tray until the level of wash fluid therein rises to the top of the downcomer 44b in the top tray. The wash fluid then flows down the downcomer 44b and fills the wash section of the next lower tray, and continues in the same manner downwardly through the trays until the wash section of each of the trays is filled with wash fluid. Any excess wash fluid is removed from the lowermost tray through line 15 and may be recirculated. The mixture to be filtered and the wash fluid are continuously charged to the tower through lines 7 and 13, as long as the filter is in operation.

When the filtering and washing sections of the various trays have been filled and circulation between the surge tank and the filtering sections of the trays has been established, rotation of the main shaft 25 is started by means of pinion 28 and large gear 27. This rotation causes the filter leaves 30 to travel through the trays in a clockwise direction (Fig. 3). A vacuum is then applied to filtrate withdrawal line 129 and wash liquid withdrawal line 131. This vacuum causes the solution within the filtering sections of the trays to be drawn through the filter leaves and the wax to be deposited thereon in a cake. By reference to Fig. 3 it will be noted that six sets of filtering leaves are in filtering position while one set is being lowered into the solution for filtering and another set is at partition 43b between the filtering and washing sections. As each vertical bank of filter leaves, operated by any one of the lifting arms 38, arrives at the end of the filtering section of the trays, adjacent partitions 43b, the roller 42 at the end of the lifting arm 38 meets with a rise in the cam track 41. Further rotation of shaft 25 then causes the roller 42 to follow the rise upwardly, thereby lifting arm 38 and consequently through lifting rods 39 the filter leaves on each of arms 31 directly beneath. The rise in the cam track (Fig. 18) is sufficient to lift the filters clear of the partition 43b. The filters are then lowered at the other side of the partitions 43b into the washing sections of the trays. While each vertical bank of filters is passing through the filtering section, the pipe 33, within the central shaft 25, which is connected to each of the filter arms 31 in each vertical bank, is in open communication with the opening 128 in the lower half of the outlet valve at the bottom of the filter. The filtrate is therefore constantly flowing out through line 129 due to the vacuum placed thereon. As each vertical bank of filters is raised from the filtering section and is lowered into the washing section, the port 121 which is in communication with that section is closed by the partition between openings 128 and 130 in the lower half 122 of the outlet valve. As soon as each vertical bank of filters is lowered into the washing section the port 121 in the upper half 120 of the outlet valve is placed in communication with opening 130 in the lower half of the valve and wash liquid outlet 131. Each vertical filtering section passes through the washing section of the trays until it arrives at partition 43c at which time its port 121 in the upper half 120 of the outlet valve will be closed by the partition between opening 130 and opening 132 in the lower half 122 of the outlet valve. As soon as each vertical section has been raised by its lifting arm 38 to a position above the wax outlet chutes 45, its corresponding valve orifice 121 will be in open communication with gas under pressure admitted to the space 132 in the lower half 122 of the outlet valve. The gas under pressure causes a distention of the filter cloth on each of the filter leaves 30, thereby causing the wax cake to break and fall off on to the chutes 45 and thence down wax flume 17. If desired the filter leaves may be maintained in open communication with wash liquid outlet 131 while being raised from the washing solution in order to permit washing fluid remaining in pipes 31, 33 and the lower valve mechanism to drain off into line 131 before admitting gas under pressure to these lines for the purpose of removing the wax cake. It is preferable, however, to make pipes 31, 33, and the valve connection of such size that they will not be filled with the washing liquid while in the washing portion of the cycle. By such provision the washing liquid at the end of the cycle would merely be flowing down the walls of the pipe 33 and the lower valve connections and would not interfere with the upward passage of the gas for wax cake removal. As each vertical bank of filters passes from the wax removal stage, it is lowered by means of cam track 41 roller 42 and arm 38 into the solution to be filtered, and the cycle repeated.

Figure 18:
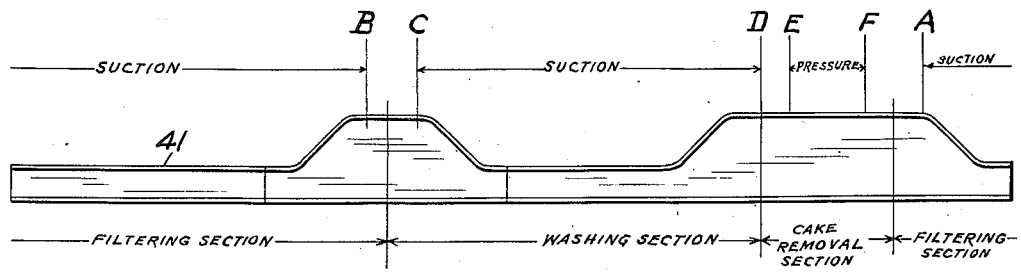
Fig. 18 is a development of the cam track for raising and lowering the filter leaves over the partitions in the trays.

With the valve shown in Fig. 16 and a cam track as shown in Fig. 18, the pipe 33 which is connected to each of the filter arms 31 in each vertical bank comes into open communication with the opening 128 in the lower half of the outlet valve when the lifting arm 38 of each vertical bank arrives at the point marked A on the cam track 41 (Fig. 18), and continues in such open communication until the lifting arm 38 arrives at the point marked B. While the lifting arms 38 of each vertical bank of filter arms is moving from point B to point C, the port 121 which is in communication with that section is closed by the partition between openings 128 and 130 in the lower half 122 of the outlet valve. As the lifting arm 38 of each vertical bank of filters passes point C, the port 121 connected to that bank comes into communication with the opening 130 in the lower half 122 of the outlet valve and continues in communication therewith until the said lifting arm 38 reaches the point D when the said port 121 is closed by the partition between opening 130 and opening 132 in the lower half 122 of the outlet valve. As soon as the lifting arm 38 of each vertical bank of filters arrives at the point E, its corresponding valve orifice 121 will be in open communication with the space 132 in the lower half 122 of the outlet valve and will continue in communication therewith until the said lifting arm 38 arrives at the point F on the track 41, at which point the corresponding port 121 will be closed by the partition space 132 and opening 128 in lower half 122 of the outlet valve, and will continue to be closed thereby until the said lifting arm 38 again arrives at the point A in track 41. It is to be understood that the above description is merely illustrative and that the exact point of applying a vacuum or gas under pressure to the filter leaves of each vertical set may be varied somewhat. If desired only one fluid outlet opening may be provided in the lower half 122 of the outlet valve, in which case the openings 128 and 130 would be one continuous opening and there would be only one liquid withdrawal line; however, we have here illustrated the preferred embodiment in which the filtrate is kept separated from the used wash fluid.

In case the filter cloth on one filter becomes loose or broken, wax will begin to appear in the filtrate obtained in line 129. In such case samples may be withdrawn from sample pipe 115 by opening valve 116 and it can thus be determined from which vertical bank of filter arms the poorly filtered material is coming. The damaged bank can then be shut off by closing valve 118 connected to this bank, and the operation continued with the other 15 banks of filters until so many filter cloths become clogged or damaged that a good filtering rate is no longer obtained.

The exact point at which suction is applied to the filter leaves can be varied slightly by rotating the lower half 122 of the valve mechanism, by rotating worm gear 144 and thus rotating gear segment 146 and yoke 134 connected thereto.

It is apparent from the above description that only the top half 120 of the rotary valve mechanism rotates with the central shaft 25, the bottom half of the valve mechanism 122 remaining fixed except on rare occasions when it is necessary to vary the point at which suction or pressure will be applied to the filter leaves. However, it is apparent that, in case of any eccentric rotation of the central shaft 25, the lower half 122 of the valve can move about by sliding on pins 135 and by pin 136 sliding in and out in member 138, so that the upper and lower halves of the valve are always held tightly together. The fluid which is placed in groove 123, to seal the joint between the upper and lower halves of the valve, is preferably some of the finished product obtained from the filtrate. The proper level of sealing fluid may be maintained in groove 123 by any well known means, such as by providing a large reservoir in which the proper level is maintained by a float valve, and connecting the reservoir to the groove 123 with suitable piping.

The cam track 41, which raises lifting arms 38 and filter arms 31, is so designed that as one vertical bank of filter arms is being raised over a partition in the trays the preceding vertical bank of the filter arms is being lowered into the next section of the trays. In this manner very little power is required to raise and lower the filter arms, the main requirement for power being to overcome frictional resistances which, however, are very small due to the fact that the central shaft is suspended from roller bearings. Since the central shaft makes one complete rotation in the order of two minutes, the filter leaves are moved very slowly through the liquid in the trays and therefore offer very little resistance to rotation.

The collection pipes 33 may be removed from the filter by jacking up the central shaft, removing bolts 58 and then lowering the central shaft until ring 148 rests on beams 149. The cover plate 50 is then removed and the bearings associated therewith may then be lifted through the top of the tower as a unit. The collection pipes 33 extend well towards the top of central shaft 25, being suitably wired together to prevent vibrations, and are closed at their upper ends by eye bolts 160. Each of nipples 80 is disconnected from socket joint 81 and the lower ends of pipes 33 are removed from cap 108. Cap 150 is removed and the collection pipes 33 can then be removed through the top by lifting eye bolt 160.

The mixture of oil, wax, and propane which is admitted to the filter section of the trays is chilled to preferably about −45° F., and consists of about 1 part of wax distillate, which may contain 16% or more of wax, to 4½ to 5 parts of propane. At this temperature the wax will have been solidified and will be held in suspension, in the oil and propane, in the form of finely divided crystals. We preferably charge a chilled mixture of oil, wax, asphalt, and propane obtained by refrigerating the mixture of mazoot and propane as described in Padgett and Stearns application Serial No. 733,108, filed June 29, 1934.

The wash fluid is preferably liquefied propane which has been chilled to about −45° F. At this temperature the pressure inside the filter tower will be approximately atmospheric. A suction of 10″ of mercury is preferably maintained on lines 129 and 131, and gas under 5–30 pounds pressure is admitted through line 133.

While this invention has been described as being particularly suitable for filtering chilled mixture of oil, wax and a solvent, it is apparent that it may be used to good advantage in other filtering operations.

It is further apparent that many modifications and changes may be made in the apparatus disclosed and claimed in the application, without departing from the spirit and scope of this invention.

What we claim and desire to protect by Letters Patent is as follows:

1. In a filter the combination which comprises a closed vertical cylindrical tower; a multiplicity of superimposed annular trays arranged within said tower; said trays comprising a filtering section, a washing section and a filter cake removal section; means for introducing the mixture to be filtered to the filtering section of said top tray; means for flowing said mixture downwardly from the filtering section of one tray to the corresponding section of the next lower tray; means for introducing wash fluid to the washing section of the top tray; means for flowing said wash fluid downwardly from the washing section of one tray to the corresponding section of the next lower tray; means for maintaining the desired liquid level in the filtering and washing sections of each of said trays; a multiplicity of filter leaves arranged in each of said trays; means for rotating said filter leaves around said trays; means for raising said filter leaves over the divisions between said sections of said trays; means for applying a vacuum to said filter leaves while they are in the filtering and washing sections of said trays; and means for supplying a gas under pressure to said filter leaves when said filter leaves are over the filter cake removal section of said trays.

2. In a filter the combination which comprises, a closed vertical cylindrical tower; a multiplicity of superimposed annular trays arranged within said tower; said annular trays comprising a filtering section, a washing section and a filter cake removal section; a central longitudinal shaft suspended in said tower; a multiplicity of vertically aligned radial filter arms extending from said shaft at the level of each of said trays; a drive wheel for rotating said central shaft; means for driving said drive wheel; spiders attached to said central shaft; means on said spiders for rotating said filter arms while permitting free vertical movement of the arms; a multiplicity of radial lifting arms extending from said central shaft near the top thereof; said lifting arms being the same in number as and vertically aligned with said filter arms; a track having raised portions thereon over the divisions between the various sections of said trays, and concentric with said tower near the top thereof; wheels on said lifting arms adapted to run on said track; means for driving said lifting arms from said main drive wheel to rotate the same with said central shaft while allowing free vertical movement of the same; means for connecting each of said lifting arms with each of said filter arms vertically aligned therewith; means for introducing a mixture to be filtered to the filtering section of each of said trays; means for introducing wash fluid to the washing section of each of said trays; means for removing filter cake from the filter cake removal section of said trays; means for applying a vacuum to said filter leaves while the same are in the filtering and washing sections of said trays and means for supplying gas under pressure to said filter leaves while the same are in filter cake removal position.

3. In a filter of the class described, means for suspending a central longitudinal shaft in a closed vertical cylindrical tower; said means comprising a supporting framework in the top of said tower; a supporting ring held by said framework; a short vertical shaft having an enlarged head thereon supported by said supporting ring; a collar surrounding said short shaft; a bearing race on the lower end of said short shaft; a bearing race on the lower end of said collar; roller bearings between said bearing races supporting said collar from said short shaft; a guide bearing between the upper end of said short shaft and said collar; and means for connecting a central longitudinal shaft to said collar.

4. A filter comprising a closed tower, a series of superimposed annular trays therein, each of said trays having partitions dividing it into arcuate filtering, washing, and filter cake removing sections, a multiplicity of filter leaves in each of said trays, means to rotate said leaves around the trays, means for lifting said filter leaves over the partitions in said trays, means through which liquid filtered through the leaves is adapted to be withdrawn, means to introduce the mixture to be filtered and the washing liquid to the topmost tray and overflow means adapted to convey such liquids from one tray to another.

5. A filter comprising a closed tower, a series of superimposed annular trays therein, each of said trays having partitions dividing it into arcuate filtering and filter cake removing sections, a rotatable upright shaft extending through the tower, a multiplicity of filter leaves in each of said trays, a multiplicity of tubes carrying the filter leaves of each tray and rotatable with the shaft and through which the liquid filtered through the leaves is adapted to be withdrawn, arms, rotating with the shaft, above the series of trays, tube-lifting members depending from said arms and engaging said tubes, and means, operable in the rotation of said arms, to lift them at intervals and thereby lift said tubes to cause the filtering leaves carried thereby to clear said partitions.

6. A filter comprising a closed tower, a series of superimposed annular trays therein, each of said trays having partitions dividing it into arcuate filtering and filter cake removing sections, a rotatable upright shaft extending through the tower, a multiplicity of filter leaves in each of said trays, a multiplicity of tubes carrying the filter leaves of each tray and rotatable with the shaft, and through which the liquid filtered through the leaves is adapted to be withdrawn, a multiplicity of filter leaves in each of said trays, means to rotate said leaves around the trays, means through which liquid filtered through the leaves is adapted to be withdrawn, the leaves of the series of trays being arranged in vertical alignment, and leaf-lifting means adapted, during the rotation of the leaves, to lift successively all the leaves in each tray to cause them to successively clear the partitions therein and to lift simultaneously vertically aligning leaves in the series of trays.

7. A filter comprising a closed tower, a series of superimposed annular trays therein, each of said trays having partitions dividing it into arcuate filtering and filter cake removing sections, a rotatable upright shaft extending through the tower, a multiplicity of filter leaves in each of said trays, a multiplicity of tubes carrying the filter leaves of each tray and rotatable with the shaft and through which the liquid filtered through the leaves is adapted to be withdrawn, arms, rotating with the shaft, above the series of trays, tube-lifting members depending from said arms and engaging said tubes, a circular cam track upon which the outer ends of such arms travel and which is adapted to lift such arms at intervals and thereby lift said tube-lifting members to cause the filtering leaves carried by the tubes to be lifted to clear said partitions.

8. A filter comprising a closed tower, a series of superimposed annular trays therein, a rotatable upright shaft in the tower, a multiplicity of filter leaves in each of said trays, a series of sets of tubes, each set of tubes carrying the filter leaves in one of the trays, and through which the liquid filtered by the leaves is adapted to be withdrawn, a number of vertical pipes within and rotating with the shaft and with which the tubes of each set communicate, liquid outflow channels at the bottom of the shaft corresponding in number to the respective pipes, a removable pipe section connecting each tube and its corresponding liquid outflow channel, means to close said pipe sections and to withdraw liquid therefrom for inspection, and a non-rotating member having a channel with which, in the rotation of the shaft, said liquid outflow channels successively register.

9. A filter comprising a closed tower, a series of superimposed annular trays therein, a rotatable upright shaft in the tower, a multiplicity of filter leaves in each of said trays, a series of sets of tubes, each set of tubes carrying the filter leaves in one of the trays, and through which the liquid filtered by the leaves is adapted to be withdrawn, a number of vertical pipes within and rotating with the shaft and with which the tubes of each set communicate, and a non-rotating member having a suction channel with which said pipes successively communicate in the rotation of the shaft, means permitting free movement of said member in a horizontal plane for preventing rotation of the same and means to adjust said non-rotating member in a circumferential direction to predetermine the points in the rotation of the shaft at which communication between said pipes and said channel are opened and closed.

10. A filter comprising a closed tower, a series of superimposed annular trays therein, a rotatable upright shaft in the tower, filtering means carried by said shaft and rotatable in the several trays, a supporting framework in the top of the tower, a member within and depending from and supported by said framework, a collar surrounding said member, said shaft being supported by and depending from said collar, and bearings between the upper ends and lower ends of said member and collar.

11. A filter comprising a closed tower, a series of superimposed annular trays therein, a rotatable upright shaft in said tower, filtering means carried by said shaft and rotatable in the several trays, a supporting framework in the top of said tower, a member having a spherical bearing surface within and depending from and supported by said framework, a collar surrounding said member, said shaft being supported by and depending from said collar, and bearings between the upper and lower ends of said member and said collar.

12. A vertical rotary valve for a filter, having a multiplicity of filter leaves therein, which comprises a section having openings therein communicating with the filter leaves of said filter, a section having openings therein communicating with said openings in said first mentioned section and connected with the outlets from said filters; means for producing relative rotation between said sections; an upstanding annular lip projecting and spaced from the last named section; an annular cup secured to said lip and extending into and above the space between the last named section and the upstanding lip and spaced from both; an annular sleeve secured to the first named section and extending down into said annular cup, and a bath of mercury contained in said annular cup.

13. A filter comprising a closed tower, a series of superimposed annular trays therein, each of said trays having partitions dividing it into arcuate filtering and filter cake removal sections, a rotatable upright shaft extending through the tower, a multiplicity of filter leaves in each of said trays, a multiplicity of tubes carrying the filter leaves of each tray and rotatable with the shaft, and through which the liquid filtered through the leaves is adapted to be withdrawn, means operative during their rotation for lifting said tubes to thereby lift the filter leaves carried thereby over the partitions between the sections of said trays, and tube driving members rotatable with the shaft and having vertical extensions maintaining them in driving engagement with said tubes and along which the tubes are slidable in their lifting and lowering movements.

14. A filter comprising a closed tower, a series of superimposed annular trays therein, each of said trays having partitions dividing it into arcuate filtering and filter cake removal sections, a rotatable upright shaft extending through the tower, a multiplicity of filter leaves in each of said trays, a multiplicity of tubes carrying the filter leaves of each tray and rotatable with the shaft, and through which the liquid filtered through the leaves is adapted to be withdrawn, vertical pipes within and rotating with said shaft, means maintaining mechanical and fluid connections between said pipes and tubes, said means comprising a joint upon which said pipes are adapted to swing vertically, means for lifting said tubes to thereby lift the filter leaves carried thereby over the partition between sections of said trays, and means rotating with the shaft and independent of said mechanical connections, engaging the tubes between their joints and the filter leaves, and adapted to rotate them with the shaft.

15. A filter comprising a closed tower, superimposed annular trays therein each having partitions dividing it into sections, a number of filter leaf clusters in each tray, a rotatable vertical central shaft, vertical pipes in said shaft and rotating therewith, nozzles on said shaft, ball and socket joints carried on said nozzles, tubes swingable vertically on said ball and socket joints and communicating through said nozzles with said pipes, and means operative in the rotation of said shaft, pipe, nozzles, sockets and tubes, to swing said tubes vertically to lift the filter leaf clusters over said partitions.

16. A filter comprising a closed tower, superimposed annular trays therein each having partitions dividing it into sections, a number of filter leaf clusters in each tray, a rotatable vertical central shaft, vertical pipes in said shaft and rotating therewith, nozzles on said shaft, ball and socket joints carried on said nozzles, tubes swingable vertically on said ball and socket joints and communicating through said nozzles with said pipes, and means operative in the rotation of said shaft, pipe, nozzles, sockets and tubes, to swing said tubes vertically to lift the filter leaf clusters over said partitions, vertically slidable plates through which the nozzles extend and which close openings in the shaft, and a spring between each socket joint and plate holding the corresponding pipe against the shaft, each plate being slidable vertically in the longitudinal expansion and contraction of the pipe carrying the corresponding nozzle.

17. A filter comprising a closed tower, superimposed annular trays therein, each having partitions dividing it into sections, a number of filter leaves in each tray, means to rotate said filter leaves around the trays, means for lifting said filter leaves over the partitions in said trays, means through which liquid filtered through the leaves is adapted to be withdrawn, means to introduce the mixture to be filtered to one section of the topmost tray and overflow means adapted to convey such mixture from one tray to the corresponding section of the next lower tray.

DANIEL B. BANKS.
PAUL D. BARTON.